(12) United States Patent
Shah et al.

(10) Patent No.: US 9,692,679 B2
(45) Date of Patent: *Jun. 27, 2017

(54) EVENT TRIGGERED TRACEROUTE FOR OPTIMIZED ROUTING IN A COMPUTER NETWORK

(71) Applicant: Cisco Technology, Inc., San Jose, CA (US)

(72) Inventors: Pritam Shah, Brookline, MA (US); Dana Blair, Alpharetta, GA (US); Rahul G. Patel, Nashua, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/515,452

(22) Filed: Oct. 15, 2014

(65) Prior Publication Data

US 2015/0036478 A1    Feb. 5, 2015

Related U.S. Application Data

(63) Continuation of application No. 12/023,099, filed on Jan. 31, 2008, now Pat. No. 8,880,724.

(51) Int. Cl.
H04L 12/26 (2006.01)
H04L 12/24 (2006.01)
H04L 12/803 (2013.01)

(52) U.S. Cl.
CPC .......... *H04L 43/10* (2013.01); *H04L 41/0668* (2013.01); *H04L 41/0677* (2013.01); *H04L 41/0686* (2013.01); *H04L 43/0858* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 6,510,067 | B1 | 1/2003 | Toebes |
| 6,578,087 | B1 | 6/2003 | Garakani et al. |
| 6,781,959 | B1 | 8/2004 | Garakani et al. |
| 6,785,735 | B2 | 8/2004 | Garakani et al. |
| 6,898,183 | B1 | 5/2005 | Garakani |
| 6,952,421 | B1 | 10/2005 | Slater |
| 7,149,917 | B2 | 12/2006 | Huang et al. |
| 7,206,288 | B2 | 4/2007 | Cometto et al. |
| 7,280,486 | B2 | 10/2007 | Suri |
| 2003/0088529 | A1 | 5/2003 | Klinker et al. |
| 2003/0204619 | A1 | 10/2003 | Bays |

(Continued)

*Primary Examiner* — Ranodhi Serrao
(74) *Attorney, Agent, or Firm* — Polsinelli LLP

(57) ABSTRACT

In one embodiment, a network device (e.g., a master controller) may detect an event on a current path in a computer network from a local network domain to a destination address prefix of a remote domain. In response, the device may dynamically (e.g., intelligently) determine a trace target destination address within the destination address prefix, and may perform (or request performance of) a Traceroute of the current path and a selection of alternate paths in the network from the local network domain to the trace target, where the Traceroute is adapted to obtain per-hop measurements along the respective traced path. The measurements may then be stored, for example, to be used for optimal path selection, fault identification reporting, etc.

14 Claims, 5 Drawing Sheets

(56) References Cited

U.S. PATENT DOCUMENTS

| | | |
|---|---|---|
| 2005/0147051 A1 | 7/2005 | Suri |
| 2005/0281192 A1 | 12/2005 | Nadeau et al. |
| 2006/0182034 A1 | 8/2006 | Klinker et al. |
| 2006/0200862 A1 | 9/2006 | Olson et al. |
| 2006/0218301 A1 | 9/2006 | O'Toole et al. |
| 2006/0239199 A1 | 10/2006 | Blair et al. |
| 2006/0239201 A1* | 10/2006 | Metzger .................. H04L 45/04 370/252 |
| 2007/0005801 A1 | 1/2007 | Kumar et al. |

* cited by examiner

EVENT TRIGGERED TRACEROUTE FOR OPTIMIZED ROUTING IN A COMPUTER NETWORK

CROSS REFERENCE TO RELATED APPLICATION

This application is a continuation of U.S. patent application Ser. No. 12/023,099, filed Jan. 31, 2008, the content of which is incorporated by reference herein in its entirety.

TECHNICAL FIELD

The present disclosure relates generally to computer networks, and, more particularly, to Traceroute operations for optimized routing in a computer network.

BACKGROUND

Currently, when a network event (e.g., a performance problem) occurs in a computer network, it is generally desirable to determine the cause of the problem, such as why traffic is no longer reaching a destination in the network, or why a delay to reach the destination has become unacceptable. All too often, however, by the time a system administrator is notified to examine the problem, the network may have self-corrected, thus hiding the problem from detection. In particular, the administrator often has to go to particular edge routers of a local domain and manually run diagnostics to the destination that is suffering from the performance problem.

Traceroute (e.g., conventional Traceroute for the Internet Protocol, or "IP") is a feature available to administrators that allows the administrator to see a hop-by-hop ("per-hop") trace of nodes in a network from a source of the Traceroute operation to a selected trace target destination. For example, when a destination prefix is unreachable, the network administrator is generally unaware of where exactly a brownout (i.e., temporary network outage) or blackout (i.e., an area of the network with conditions or configurations where packets enter, but do not emerge) is occurring in the network. Also, when congestion happens and an application experiences greater than expected packet loss or round trip time (RTT), it may be beneficial to see per-hop measurements from the source to the destination. Traceroute may be used in these situations by the administrator to determine per-hop measurements to diagnose the problem. Again, however, an issue with manually applying Traceroute diagnostics is that the network event may no longer be occurring (e.g., may have been corrected).

In addition, another issue associated with Traceroute is determining an appropriate trace target to which to direct the Traceroute. For instance, certain targets may not be operational (e.g., the cause of the event), or the administrator may only be generally aware of a destination address prefix having trouble, and not a particular target address within that prefix as needed by the Traceroute operation. Further, traditional Traceroute is typically applied to a current path from the source to the target destination (e.g., a "best" path as determined by various routing protocols), and does not provide additional measurements, e.g., for any alternate available paths through the network, that may otherwise be used for additional purposes.

BRIEF DESCRIPTION OF THE DRAWINGS

The embodiments described herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
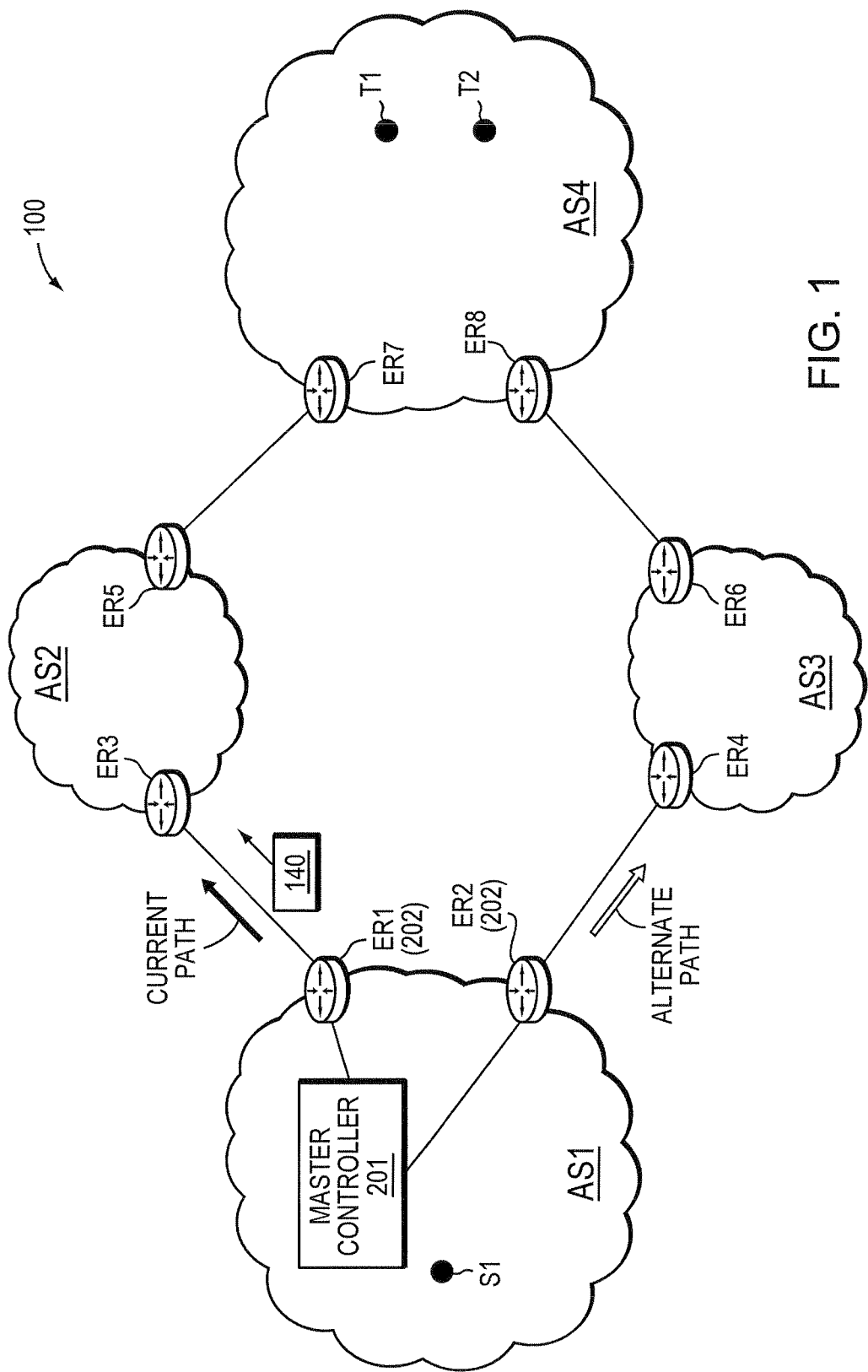
FIG. 1 illustrates an example computer network.

According to some embodiments of the disclosure, a network device (e.g., a master controller) may detect an event on a current path in a computer network from a local network domain to a destination address prefix of a remote domain. In response, the device may dynamically (e.g., intelligently) determine a trace target destination address within the destination address prefix, and may perform (or request performance of) a Traceroute of the current path and a selection of alternate paths in the network from the local network domain to the trace target, where the Traceroute is adapted to obtain per-hop measurements along the respective traced path. The measurements may then be stored, for example, to be used for optimal path selection, fault identification reporting, etc.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a node that interconnects different domains together is generally referred to as an "edge node/router" (or "border node/router").

FIG. 1 is a schematic block diagram of an example computer network 100 illustratively comprising nodes (e.g., personal computers, work stations, etc.) S1, T1, and T2, and interconnected by links and network devices (e.g., routers) between one or more network domains (e.g., AS1-AS4) as shown (notably, links/routers within an AS are not shown for simplicity). Illustratively, each domain may comprise one or more interdomain/edge routers, e.g., ER1-ER8, through which client communications, such as data packet traffic, may pass into and out of the AS as shown. In general, each AS may be an enterprise network, a service provider network (an "ISP"), or any other network or subnetwork. Furthermore, each AS, illustratively AS1 and AS4, may be multi-homed, i.e., comprising a plurality of different peer (neighboring) connections to one or more other routing domains or ASes (e.g., AS1 to AS2 and AS3 via ER1 and ER2, respectively). In addition, routing operations at certain edge nodes ER1-2 may be managed by a routing master controller (RMC) 201, such as in accordance with optimized edge routing (OER) as described herein (e.g., as an OER "Master node" or OER master controller), which may be connected to the edge nodes by, e.g., point-to-point links or a local area network.

Data packets 140 (e.g., traffic) may be exchanged among the nodes/devices of the computer network 100 using predefined network communication protocols such as the TCP/IP, User Datagram Protocol (UDP), Asynchronous Transfer Mode (ATM) protocol, Frame Relay protocol, Internet Packet Exchange (IPX) protocol, etc.

Figure 2:
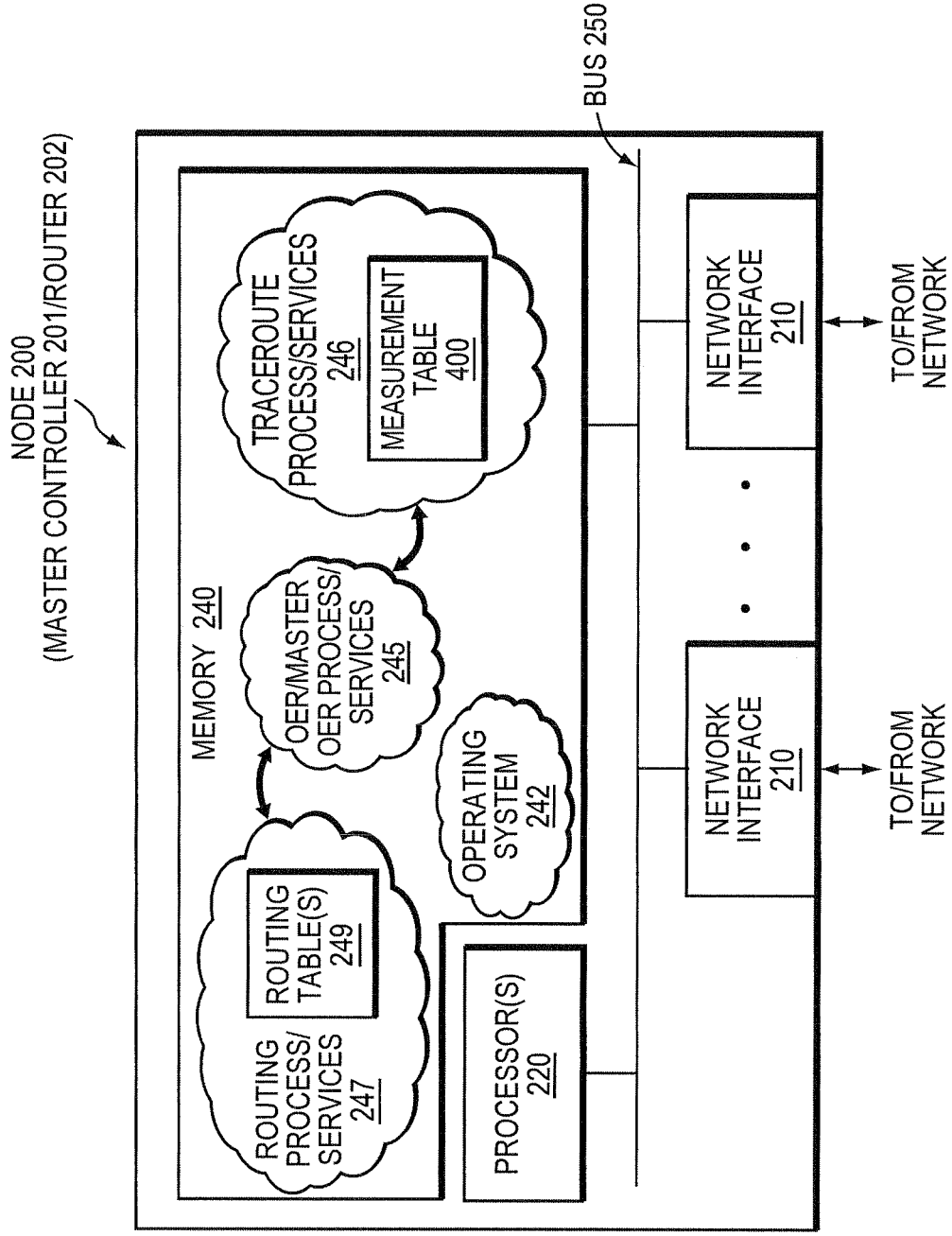
FIG. 2 illustrates an example network device/node.

FIG. 2 is a schematic block diagram of an example node/device 200 that may be advantageously used with one or more embodiments described herein, e.g., as routing master controller ("201") or a router (e.g., edge router, "202"). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. Each processor 220 may comprise necessary elements or logic adapted to execute the software programs and manipulate the data structures, such as routing tables 249 and measurement table 400. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, OER/Master OER process/services 245, and Traceroute process/services 246 (e.g., in conjunction with OER process 245) in accordance with one or more embodiments described herein. It will be apparent to those skilled in the art that other processor and memory means, including various computer-readable media, may be used to store and execute program instructions pertaining to the inventive technique described herein.

Routing process/services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage one or more routing/forwarding information database (e.g., routing tables 249) containing, e.g., data used to make routing and forwarding decisions. Specifically, the routing tables are generally used for storing reachable destination addresses, a next-hop interface, and next-hop address to reach each destination, and optionally other information, such as an associated metric (e.g., cost) of reaching the destination, based on network topology. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for Multi-Protocol Label Switching, etc., each as will be understood by those skilled in the art.

OER/Master OER process/services 245 contain computer executable instructions executed by each processor 220 to perform functions illustratively employed by an OER node 202 (e.g., edge routers ER1-2) and an OER master controller 201, respectively. The Master OER process 245 executing on the OER Master node communicates with edge routers ER1-2 to request, among other things, the monitoring of a set of address prefixes. The OER processes 245 executing on the edge routers monitor traffic at the edge of the AS1 and respond with, inter alia, network statistics corresponding to the monitored prefixes. Illustratively, OER process 245 may be configured to measure various types of network statistics acquired from monitored traffic. (Notably, while one OER process 245 is illustratively in memory 240, instances of the OER process 245 may execute on the network interfaces 210 (not shown).) These statistics are then forwarded to the Master OER process 245. The statistics may correspond to various traffic measurements, such as round-trip delay times (RTT), data throughput (i.e., the amount of data transferred or received), packet loss, reachability, etc. for each of the monitored prefixes. In general, the OER processes 245 may measure any arbitrary traffic metric, including conventional cost-based and distance-based metrics. Further, the OER process 245 may calculate statistical averages, variances, medians, etc. of a collection of traffic measurements.

The statistics and measurements received from the OER process 245 of the edge routers 202 may then be processed at the OER master controller 201 in accordance with the Master OER process 245. More specifically, the Master OER process 245 analyzes the statistics and determines whether the distribution of traffic entering and/or leaving the AS1 can be optimized. If so, the Master OER process may redistribute traffic routed through the edge nodes by, e.g., associating new BGP local-preference values with selected traffic or statically changing the routing table contents of the edge nodes (which may then be propagated within AS1 accordingly). In that sense, the Master OER process selects optimal exit links (OELs) (that is, a "best exit selection") to various destination prefixes, e.g., based on traffic type, traffic class, destination prefixes, etc., in addition to their real-time performance as determined by the received statistics. Ultimately, the end result is improved Internet performance, better load distribution, and/or lower costs for Internet connections. Notably, the Master OER process 245 may be distributed among a plurality of nodes, and thus need not reside in a single OER master controller 201. Also, it is not necessary for a single OER master controller to contain routing processes or routing tables, other than what is necessary for communication with the border nodes.

In order to obtain statistics in accordance with one or more embodiments described herein, the OER processes 245 may passively monitor and/or actively probe the monitored prefix. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Probe packets are used by an edge node/router to measure various parameters (e.g., jitter, delay, loss, reachability, etc.) associated with reaching the monitored prefix (e.g., a target prefix) in the network. Specifically, probe packets (requests) are generated by the edge router 202 (OER process 245), generally upon a request from the OER Master Controller 201, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packet to measure the various parameters associated with reaching the target prefix, and returns the results to the OER Master controller.

For instance, assume that edge router ER1 in AS1 measures round-trip packet delay times (RTT) for traffic sent to target T1 in AS4, such as by measuring latencies of establishing a TCP session. The OER processes 245 of ER1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the probe packets may be used with a number of known protocols, such as ICMP, UDP, TCP, RTP, HTTP, etc. Notably, echo request and reply messages (echo packets) from the various protocols are described generally herein as probe packets. Moreover, it may be desirable to control the rate at which the probe packets are sent to the targets to thereby avoid refusal (filtering) by the ISP from what may appear to be a "denial of service" or "DoS" attack. As a result, the rate at which probe packets are sent may be limited to a very slow rate, e.g., one probe packet per minute.

The edge routers 202 send the probe packets to various targets that represent a given monitored prefix. Targets within the given prefix may either be configured targets or learned targets. A configured target may be manually configured by a system administrator or customer at the OER Master node. An example of a configured target may be where an administrator has an agreement with the target in the prefix, e.g., such as a target using UDP. Each configured target is assumed to be usable, such as where the agreement between networks (ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within the prefix, such as T1-Tn (e.g., T2). An example software application that may be used to collect network statistics is NetFlow™ by Cisco Systems, Inc. These learned nodes from the target prefix may then be used as the learned targets. Typically, although not necessarily, the most frequently used nodes or the nodes with the highest traffic throughput will be the most representative learned target nodes for a given prefix, such as a web server within the prefix. It may be desirable, however, to use configured targets prior to using learned targets.

One issue that arises with the use of targets to represent an entire monitored prefix is how to determine if a target is a valid target. For example, while a responding target is a valid target that can be used to measure parametric information, a non-responding target may be caused by a network problem, e.g., policy filtering (e.g., firewalls), blackholes, brownouts, etc., or simply that the target (host) itself was turned off (e.g., for maintenance or other reasons) or otherwise not responding for its own specific (non-network related) reason. In the case of a non-responding target, non-response due to a network problem such as a failure is valid for purposes of measuring parametric information for the monitored prefix, since a network failure in reaching the target may apply to reaching the entire monitored prefix. Non-response due to the target itself being powered off or otherwise inaccessible or inactive is not valid for measuring parametric information, because it does not represent the monitored prefix as a whole. Also, in the event that all representative targets for a monitored prefix do not respond, the source may improperly conclude that the entire prefix is unreachable, while the prefix in general (other than the non-responding targets) may still exist and function properly.

An illustrative target management technique, therefore, may dynamically select an optimal set of valid targets for a particular (monitored) prefix of the computer network. Specifically, one or more targets may be selected from a pool of possible learned and configured targets to be used as representatives of the monitored prefix. Probe packets may be sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets may be discarded, while invalid configured targets may be returned to the pool of possible targets for potential re-selection in a later evaluation period.

Notably, in a typical network, there are often multiple paths that may be available to reach a particular destination prefix (e.g., for multi-homed sites as discussed above). Active probing generally probes all available paths in order to determine the parametric information, thereby allowing OER processes to select one or more preferred paths from the set of all paths (e.g., according to a specified policy). Actively probing all available paths all the time to determine the best path requires significant resources on the probe source (router), the target and, generally, the network. As those skilled in the art will understand, the network is more likely to filter probe responses during the probing of all paths, while the probing may actually create congestion that impacts the quality of each probe packet and response.

An illustrative technique may thus be utilized for efficiently sending probe packets from a source to a target in a destination prefix over two or more paths of a computer network. For example, OER processes 245 may send probe packets over a selection of one or more (e.g., all) available paths (exits) to the target in the destination prefix (e.g., through ER1 or ER2). Once the preferred path is selected ("path selection optimization"), the source OER processes 245 may send probes to that target only over the preferred path until a trigger occurs, such as, e.g., an out of policy (OOP) event, a policy change, or an optional timer-based trigger. Upon being triggered, the source again probes all paths (the current path and the alternate/non-current paths) to reselect the preferred path to reach the target (i.e., the associated destination address prefix).

Traceroute process/services 246 contain computer executable instructions executed by each processor 220 to perform Traceroute operations in accordance with one or more embodiments described herein. For instance, Traceroute techniques have been developed as an extension to echo requests in order to trace the route (path) that a packet traverses between two or more nodes. Conventionally, a Traceroute is performed by sending echo requests from a source node to a destination node that have progressively longer time-to-live (TTL) values. For instance, a first echo request with a TTL of "1" may reach a first intermediate node between the source and destination (a "next-hop" node). When the first intermediate node receives the echo request, it decrements the TTL to "0", and returns a message (e.g., an error message) to the source node (generally, with the address of the first intermediate node). The source node may then send a second echo request with a TTL of "2" that is received by the first intermediate node, which decrements the TTL to "1" and forwards the echo request to a second intermediate node (a "next-next-hop" node). The second intermediate node decrements the TTL to "0", and also returns a message (e.g., an error message) to the source node. The source node may continue to send subsequent echo requests with increasing TTL values until the route between the source and destination has been traced. Notably, Traceroutes may also return various measurements along with the hop-by-hop trace, such as a delay value in reaching each hop, as will be appreciated by those skilled in the art. Such measurements (and the traced route) may be stored in measurements table 400, as described below.

As noted, when a network event (e.g., a performance problem) occurs in the network, it is generally desirable to determine the cause of the event/problem, such as why traffic is no longer reaching a destination, or why a delay to reach the destination has become unacceptable. An administrator is often notified to go to particular edge routers of a local domain and manually run diagnostics (e.g., Traceroutes) to the destination that is suffering from the performance problem. Again, however, an issue with manually applying Traceroute diagnostics is that the network event may no longer be occurring (e.g., they may have self-corrected). Other issues are also presented with the use of traditional (manual) Traceroute, such as determining an appropriate trace target to which to direct the Traceroute, or only applying the Traceroute to the current path from the source to the target destination, etc. The embodiments described herein, therefore, address the aforementioned concerns of using Traceroute and utilizes Traceroute in an efficient and enhanced manner (e.g., for optimized routing).

Event Triggered Traceroute for Optimized Routing

According to embodiments of the disclosure, a network device (e.g., a master controller 201) may detect an event on a current path in a computer network from a local network domain (e.g., AS1) to a destination address prefix of a remote domain (e.g., AS4). In response, the device 201 may dynamically (e.g., intelligently) determine a trace target destination address (e.g., T1) within the destination address prefix, and may perform (or request performance of) a Traceroute of the current path and a selection of alternate paths in the network from the local network domain to the trace target, where the Traceroute is adapted to obtain per-hop measurements along the respective traced path. The measurements may then be stored, for example, to be used for optimal path selection, fault identification reporting, etc.

Illustratively, one or more embodiments described herein may utilize OER processes 245 in conjunction with Traceroute process 246 to provide for event triggered Traceroute for optimized routing in accordance with one or more embodiments described herein. In particular, both processes 245 and 246 may be co-located on the OER master controller 201 to provide for a centralized and event driven OER policy-based Traceroute with the attainment of one or more advantages described in detail herein. Notably, according to one or more embodiments, OER process 245 and Traceroute process 246 may also be combined as a single "OER Traceroute process" to perform the functions described herein, and the separate processes 245/246 are merely an example.

Operationally, the OER master controller 201 (Master OER process 245) may detect an event on a current path from a local network domain (AS1) to a destination address prefix of a remote domain (AS4). For example, an event may be detected when an out-of-policy (OOP) parameter is detected. OOP parameters may be based on a set of one or more parameter policies configured at the master controller 201 in accordance with OER techniques described above. For instance, Master OER process 245 may be configured to route traffic from a source node S1 to a destination prefix (e.g., containing nodes T1 and T2) having a delay no greater than 30 ms. (Alternatively, AS1 may have an agreement with AS2 that the delay to reach AS4 is no greater than 30 ms, etc.). If Master OER process 245 detects that the delay to reach the destination prefix (or to traverse AS2) is greater than 30 ms, e.g., 50 ms, then the delay parameter for the current path is considered to be OOP. As noted above, such parameters may be measured using passive monitoring and/or active probing. Further, an OOP event may be that the destination prefix is no longer reachable (i.e., is unavailable), such as when a probe response is no longer received.

In addition to OOP events, route/path related events may also be used to trigger the OER Traceroute. For instance, an event may be detected if a route change has occurred along the current path (e.g., learned through BGP advertisements). Also, as mentioned above, to determine an optimal path, Master OER process 245 may periodically trigger a probe of the current path (e.g., over ER1) and a selection of alternate paths (e.g., over ER2) for path selection optimization. In other words, when probing more than just the current path (e.g., "probe-all" or "probe-N"), Traceroute may also be triggered for more than just the current path, such as to be used for path selection optimization (described herein). In this manner, a "periodic Traceroute" operation may be performed as part of path selection optimization, accordingly, such that Master OER process 245 may select an optimal exit from its network based on the Traceroute results (again, described herein). (Notably, the events mentioned herein are merely illustrative examples, and are not meant to limit the scope of the embodiments described herein. For example, OOP events on the alternate paths may also be considered an event that may trigger Traceroute, and the embodiments described herein are not limited to events that occur on the current path.)

In accordance with one or more embodiments described herein, the OER master controller 201 may dynamically (e.g., intelligently) determine a trace target destination address within the destination address prefix to be used as the destination of the Traceroute (e.g., in response to the event or periodically in advance of an event). For instance, while OER generally operates on address prefixes (e.g., for path selections), Traceroute uses explicit targets within the prefixes. As such, Master OER process 245 may dynamically obtain host addresses that belong to optimized prefixes for use as trace targets (e.g., T1 or T2). For example, the trace target may be a last known reachable target or an actively responsive destination address, e.g., of the probe packets described above. That is, if active probing of targets is configured, OER may use the addresses of probes that are currently responding (reachable/active). Alternatively or in addition, the trace target may be learned through traffic monitoring for active destination address detection (i.e., detecting traffic to/from a particular target within the desired prefix). In other words, if dynamic prefix learning is configured, OER may learn the address of current active hosts along with the prefixes, e.g., using NetFlow™ as mentioned above. Notably, by using dynamically (intelligently) acquired trace targets, Traceroute results obtained via OER in accordance with one or more embodiments described herein are more predictable and/or useful (e.g., accurate) than other methods of configuring trace targets (such as static configuration by a network administrator).

Once the event is detected and the trace target selected, OER process 245 may perform a Traceroute of the current path (e.g., from ER1) and a selection of alternate paths (e.g., all alternate paths/exits, such as from ER2) from the local network domain (AS1) to the trace target (e.g., T1). For example, Master OER process 245 of master controller 201 may request the performance of the Traceroute from respective egress/exit nodes 202 of its local domain, such as from ER1 and ER2. As such, ER1 and ER2 may each originate a Traceroute (e.g., by Traceroute process 246) to the trace target in the destination address prefix. By doing this, the Traceroute (e.g., the multiple Traceroutes one from each egress node 202) may obtain per-hop measurements along the traced paths as described above. For instance, the Traceroute may record each hop (node) along the path to the trace target, as well as the delay to reach each hop.

Figure 3:
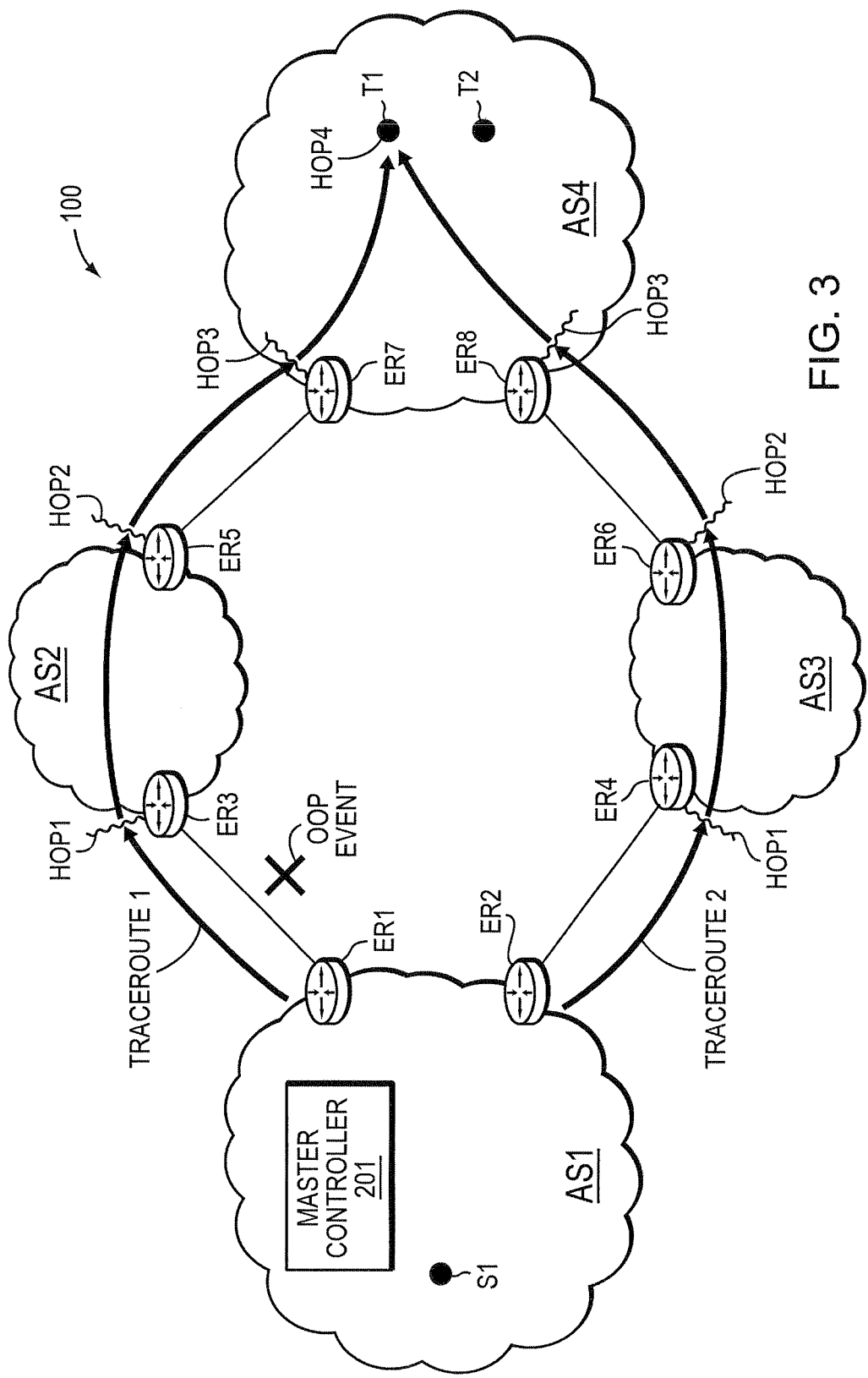
FIG. 3 illustrates an example computer network as in FIG. 1.

FIG. 3 is a schematic block diagram of the example computer network 100 as shown in FIG. 1 above illustrating Traceroutes (1 and 2) performed in response to a detected event, accordingly. As may be appreciated by those skilled in the art, each Traceroute (e.g., from ER1 and ER2) traverses a respective path toward the trace target (e.g., T1) one hop at a time, where each hop receives a timed-out TTL timer/value, and returns the appropriate response to the source of the Traceroute. For example, Traceroute 1 may be sent toward T1 from ER1 (Traceroute process 246) with a first TTL value of 1. Upon receipt, ER3 decrements the TTL to 0, and returns a response (e.g., an error message or otherwise, as mentioned herein) to ER1. ER1 may then send a second part of the Traceroute, particular, a second message having a TTL value of 2. As such, ER3 receives the message/packet, decrements the TTL value to 1, then forwards the message toward T1. ER5 then receives the message, and decrements the TTL value to 0, and returns another response to ER1. This Traceroute process continues to ER7 and ultimately to T1 (assuming each hop is reachable). (Traceroute 2 similarly may be originated by ER2 along an alternate path, such that ER4, ER6, ER8, and T1 return per-hop responses, accordingly.)

Note that as an enhancement to traditional Traceroute (i.e., IP Traceroute), OER Traceroute may illustratively represent particular traffic classes and their associated traversal through the network, rather than simply measuring traversal of conventional Traceroute messages (e.g., Traceroute pings). For instance, it may often be the case where a ping message (echo request) may reach the target destination, thus indicating that the target is reachable, however, at the same time, certain classes of traffic (e.g., voice traffic), may be experiencing network problems related to its class. For example, data traffic may be allowed to pass through certain problem areas (or firewalls, etc.), but voice data may not be so allowed. Accordingly, in a manner similar to OER probes, OER Traceroute may generate and use packets that represent the particular traffic class as desired (e.g., sending a masked voice packet with increasing TTL values, rather than a simple ping packet). In this manner, the results obtained from the OER Traceroute more closely represent actual parameter measurements that would be seen with regard to the associated traffic classes.

Figure 4:
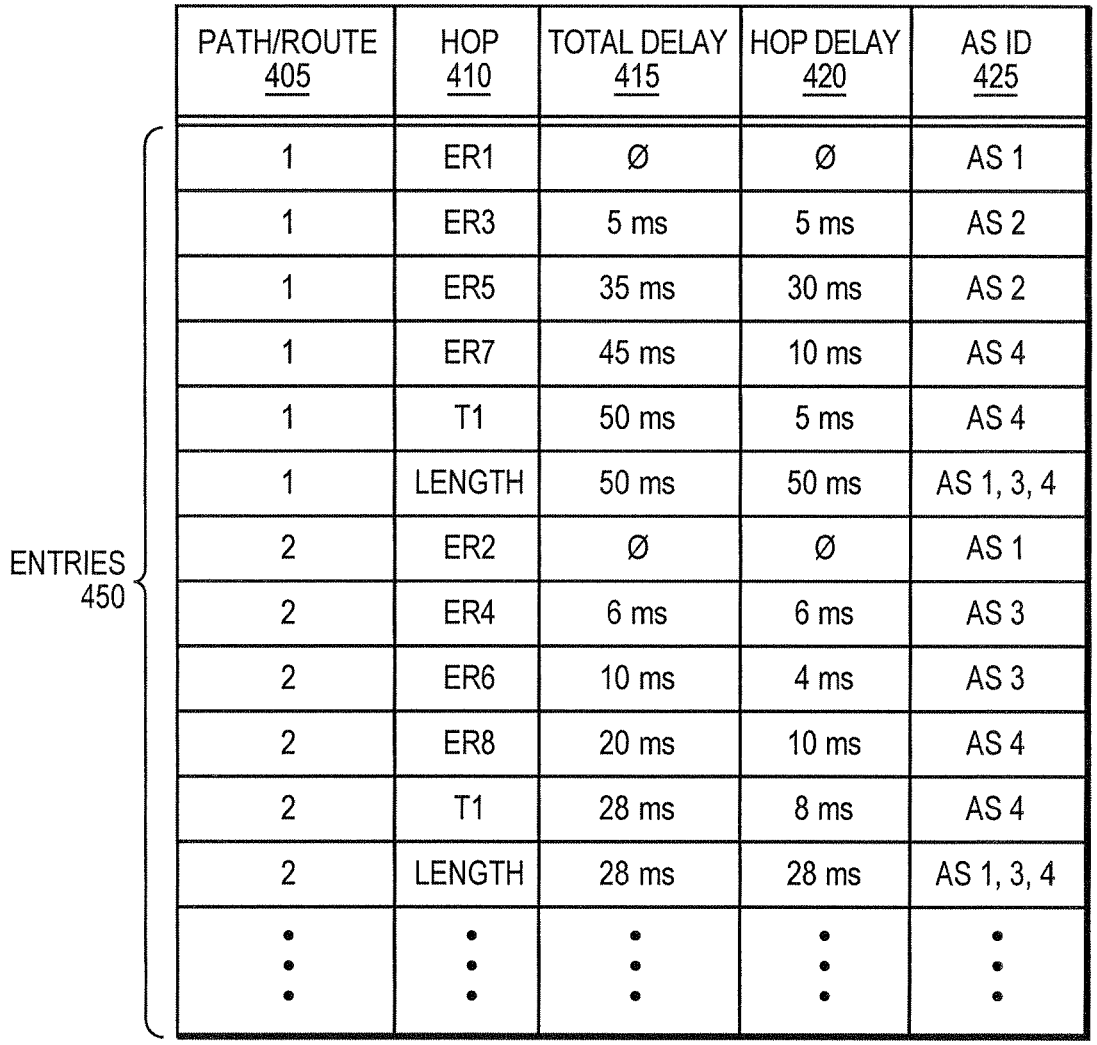
FIG. 4 illustrates an example measurement table.

FIG. 4 is a schematic block diagram of an example measurements table 400 that may be advantageously used with one or more embodiments described herein to store the measurements obtained from the Traceroutes. The table 400 is illustratively stored in memory 240 (e.g., of OER master controller 201) and includes one or more entries 450, each comprising a plurality of fields, e.g., path/route field 405, hop field 410, total delay field 415, per-hop delay field 420, and AS identification (ID) field 425. The table 400 may be illustratively maintained and managed by Master OER process 245 and/or Traceroute process 246 (e.g., singularly or in combination) on the OER master controller, e.g., in order to provide a consolidated and centralized storage and maintenance location (that is, the edge routers 202 may transmit the results of the Traceroutes to the OER master controller 201, such as through OER process 245 communication). Those skilled in the art will understand that while a table is shown and described herein, other known data structures and entries may be used in accordance with the present invention, and the table 400 as shown is merely illustrative.

In particular, path/route field 405 may illustratively be used to store an identification of the particular Traceroute to which the measurements belong, e.g., Traceroute 1 or 2 (or, alternatively, indicating the egress node 202 from which the results were received, e.g., ER1 and ER2). Hop field 410 may store the hop-by-hop identifications of nodes responding to the TTL time-outs, thus producing the hop-by-hop traced route (note that an addition entry 450 may be specifically dedicated to the entire traced route, e.g., the "length" entry). Also, in accordance with Traceroute techniques, total delay field 415 may store the delay value received from the responding node (in hop field 410), that is, the delay associated with the Traceroute message's reaching the node from the source edge router 202. Per-hop delay field 420 may store a calculated value of delay between hops, e.g., determined by subtracting the previous hop's total delay value 415 from the current hop's total delay value. In addition to the measurements described above, other measurements may also be obtained from the illustrative OER Traceroute techniques described herein. For example, requested within each Traceroute may be a recording of an associated network domain identification (e.g., an AS number) for each per-hop measurement. In other words, as each node responds to a timed-out TTL value, the Traceroute message may be configured to request (or otherwise obtain) a network domain ID of the responding node. For instance, when ER3 responds, the associated ID for AS2 may also be returned, indicating that ER3 is within AS2, and this value may be stored in AS ID field 425 of the corresponding entry 450.

According to one or more embodiments described herein, the Traceroute measurements may thus illustratively provide for network performance parameters on a per-path, per-hop (and per-AS) basis on all (or a subset/selection of) paths from the source network domain to the destination target address (e.g., prefix), such parameters including, inter alia, delay/RTT, hop count/identification, AS numbers, etc. This information is used in diagnosing unexpected network performance events, particularly in real time. The dynamic responsiveness and trace target selection not only eliminates human intervention needed to start Traceroute from each edge router 202 in response to certain events, but also consolidates the results in one location to provide network processes (e.g., OER process 245) and/or network administrators with per-hop information on all possible paths. For instance, such measurements may be used for real-time fault identification, and to identify any OOP hops on each of the current path and alternate paths to the target destination (prefix). As such, the Traceroute measurements and/or results from various calculations/determinations/etc., may be reported to the network processes and/or network administrators, accordingly. Also, with the per-AS measurements (AS ID field 425), an appropriate management process and/or administrator of a particular remote domain may be notified of the measurements (or simply of the problem), such as to trigger self-correcting mechanisms or further investigation for which the dynamically obtained measurements may be helpful.

In addition to collecting and reporting the Traceroute measurements in table 400 (e.g., for fault identification), Master OER process 245 may use the measurements to determine an optimal path (best exit selection) for the destination address prefix accordingly. For instance, the optimal path may be determined based on a path selection policy that is dependant on the per-hop Traceroute measurements, such as, e.g., new policies that may state that no delay between hops be greater than 2 ms, thus allowing for a per-hop policy parameter. Other policies based on the measurements obtained above may also be used in accordance with one or more embodiments described herein, such as basing path determination on the collected AS numbers, the delay per-AS, the number of hops within an AS, etc. Note that the use of Traceroute to determine optimal paths may be in response to the events mentioned above (e.g., OOP parameter detection, route change, probe-N, etc.), such as where a new path may need to be located (or where the current path needs to be confirmed as the optimal path), or in response to a trigger to perform the illustrative OER Traceroute techniques for the purpose of path selection optimization (e.g., particularly to determine whether a given traffic class is within policy conformance on all possible paths, and to select the best path therefrom).

Notably, in the event that OER process 245 determines that the selected trace target is non-responsive, e.g., the trace to the target does not complete, another trace target may be attempted, accordingly. For example, in a manner similar to that described above for probe targets, OER process 245 may rotate through non-responsive trace targets until a responsive trace target is determined. It may be possible, however, that no trace targets will be responsive, such as where the entire destination prefix is unreachable. In this situation, though, the Traceroute is still particularly beneficial in determining the last reachable hop along the path(s) toward the trace targets, as may be appreciated by those skilled in the art (e.g., for fault identification, as described herein).

Figure 5:
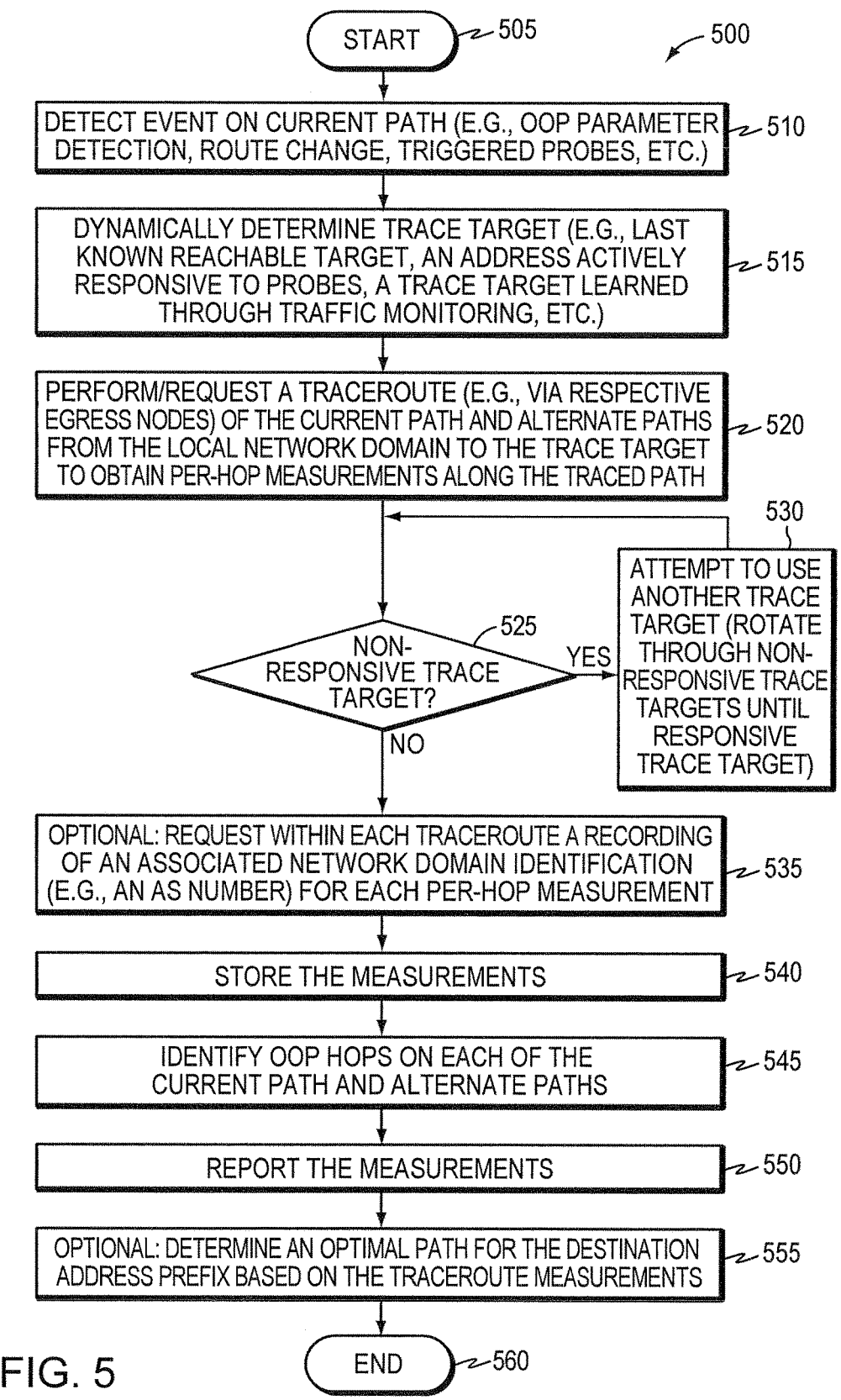
FIG. 5 illustrates an example procedure for event triggered Traceroute for optimized routing.

FIG. 5 illustrates an example procedure that provides for event triggered Traceroute for optimized routing in accordance with one or more embodiments described herein. The procedure 500 starts at step 505, and continues to step 510, where an event is detected on the current path by the master controller (e.g., master OER process 245 of master controller 201), such as, e.g., an OOP parameter detection, a route change, triggered probes (e.g., probe-N), etc., as mentioned above. In step 515, the master controller may dynamically determine a trace target, for instance, a last known reachable target, an address actively responsive to probes, a trace target learned through traffic monitoring, etc. Then in step 520, responsive to the detected event, a Traceroute may be performed (e.g., requested from respective egress nodes ER1-ER2) of the current path and alternate paths from the local network domain (e.g., AS1) to the trace target T1 (e.g., in AS4) to obtain per-hop measurements along the traced path. (Notably, as mentioned above, in the event there is a non-responsive trace target in step 525, then another trace target, e.g., T2, may be attempted in step 530, e.g., rotating through non-responsive trace targets until a responsive trace target is found.) Further, it may be optionally requested in step 535 that each Traceroute records an associated network domain identification (e.g., an AS number) for each per-hop measurement.

In step 540, the master controller 201 may store the measurements (e.g., in table 400), and based on the returned measurements, OOP hops on each of the current path and alternate paths may be identified in step 545. In step 550, the master controller 201 may also report the measurements, such as to a network administrator or other interested network processes as mentioned above (e.g., of other network domains). Also, in optional step 555, the master controller 201 may determine an optimal path for the destination address prefix (corresponding to the trace target) based on the Traceroute measurements, accordingly. The procedure 500 then ends in step 560.

Advantageously, the novel techniques described herein provide for event triggered Traceroute for optimized routing in a computer network. By dynamically triggering Traceroute to intelligently selected targets, the novel techniques enable intelligent and automatic analysis of network problems, as well as the collection of Traceroute and OOP information for trend analysis, fault identification, path selection, etc. In particular, the techniques described above provide for consolidated and centralized reporting of Traceroute results from the current path and each of the alternate paths to a destination prefix, including identification of OOP hops in each of the possible paths, accordingly. Also, the dynamic aspects of one or more embodiments described herein alleviate the need for cumbersome and inefficient manual configuration.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method comprising:
   requesting, at a master controller in a local network domain, monitoring of an address prefix of a remote domain by an edge node in the local network domain;
   detecting an out-of-policy event on a path from the local network domain to the address prefix of the remote domain;
   determining a trace target destination address within the address prefix;
   performing a route trace of the path;
   based on the route trace, storing per-hop measurements along the path;
   creating a fault identification report based on the per-hop measurements;
   determining, based on the fault identification report, to redistribute traffic entering or leaving the local network domain, to yield a determination; and
   based on the determination, redistributing traffic routed through the edge node, wherein redistributing the traffic further comprises performing one of:
   associating new border gateway protocol (BGP) preference values with the traffic;
   statically changing routing table contents of the edge node; or
   selecting an exit link to a plurality of destination prefixes.

2. The method of claim 1, further comprising:
   receiving, from the edge node, network statistics associated with the address prefix; and
   further performing the determination based on the network statistics.

3. The method of claim 1, wherein the out-of-policy event is one of a policy change, a timer-based trigger, a delay above a threshold, or an unreachable address prefix.

4. A system comprising:
   a processor; and
   a non-transitory computer-readable medium storing instructions which, when executed by the processor, cause the processor to perform operations comprising:
   receiving, at an edge node in a local network domain from a master controller in the local network domain, a request to monitor an address prefix associated with a remote domain;
   measuring network statistics regarding traffic associated with the address prefix by generating a probe packet to measure a parameter associated with reaching the address prefix from an originating node and transferring the probe packet to a target node associated with the address prefix, wherein the target node is a learned target that is learned (1) by monitoring the traffic and (2) by detecting a data connection between the edge node in the local network domain and the learned target in the remote domain; and
   forwarding the network statistics to the master controller.

5. The system of claim 4, wherein measuring the network statistics comprises monitoring one of throughput, timing, latency, packet, loss, or reachability of the traffic.

6. The system of claim 4, wherein the parameter is one of jitter, delay, loss, or reachability.

7. The system of claim 4, wherein the probe packet is generated upon receiving a probe request from the master controller.

8. The system of claim 4, wherein the target node is a configured target that is manually configured by a user at the master controller.

9. The system of claim 4, wherein the learned target is a most frequently used node chosen from a plurality of learned targets in the remote domain.

10. The system of claim 4, wherein the learned target is a node with a highest traffic throughput among a plurality of learned targets in the remote domain.

11. The system of claim 4, wherein the non-transitory computer-readable storage medium stores additional instructions which, when executed by the processor, cause the processor to perform the operations further comprising:
    transferring the probe packet to a plurality of target nodes associated with the address prefix.

12. The system of claim 4, wherein the master controller is configured to:
    receive, from the edge node, the network statistics;
    determine, based on the network statistics, to redistribute traffic entering or leaving the local network domain can be optimized, to yield a determination; and
    based on the determination, redistributing traffic routed through the edge node, wherein redistributing the traffic further comprises performing one of:
    associating new border gateway protocol (BGP) preference values with the traffic;
    statically changing routing table contents of the edge node; or
    selecting an exit link to a plurality of destination prefixes.

13. A non-transitory computer-readable storage device storing instructions which, when executed by a processor, cause the processor to perform operations comprising:
    detecting an out-of-policy event on a path from a local network domain to an address prefix of a remote domain;
    identifying, within the remote domain, a trace target destination address having the address prefix;
    performing a route trace by transferring probes to trace target destination address;
    based on the route trace, storing per-hop measurements along the path; and
    creating a fault identification report based on the per-hop measurements;
    determining, based on the fault identification report, to redistribute traffic entering or leaving the local network domain can be optimized, to yield a determination; and
    based on the determination, redistributing traffic routed through an edge node, wherein redistributing the traffic further comprises performing one of:
    associating new border gateway protocol (BGP) preference values with the traffic;
    statically changing routing table contents of the edge node; or
    selecting an exit link to a plurality of destination prefixes.

14. The non-transitory computer-readable storage device of claim 13, wherein the non-transitory computer-readable storage device stores additional instructions which, when executed by the processor, cause the processor to perform further operations comprising:
- receiving, from the edge node, network statistics associated with the address prefix; and
- further performing the determination based on the network statistics.

* * * * *